Figure 7:
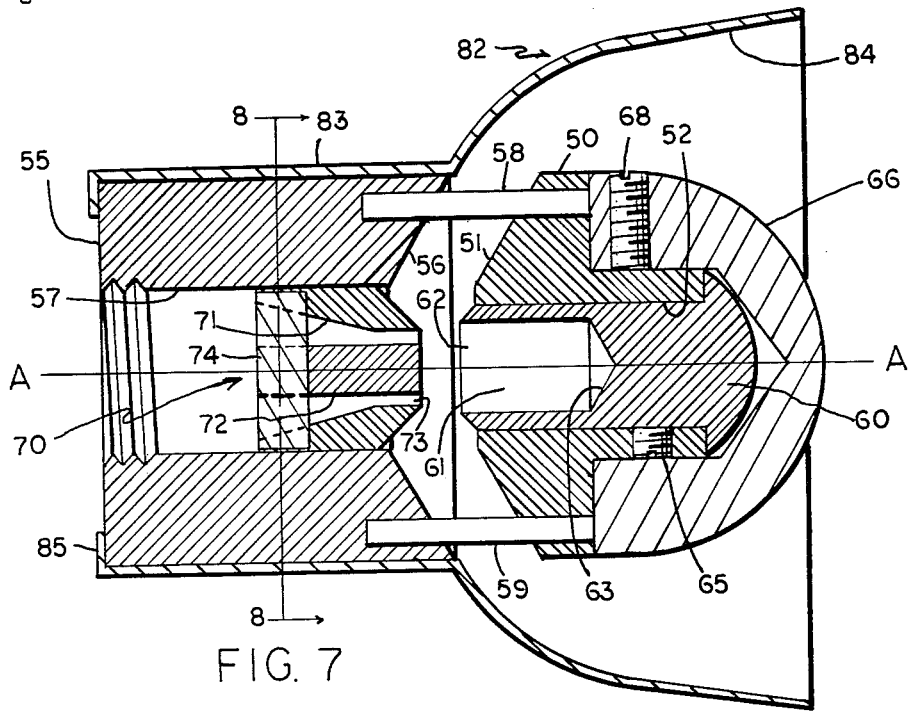

Feb. 16, 1965     S. R. RICH     3,169,509
ELASTIC WAVE GENERATOR
Original Filed Jan. 18, 1962     2 Sheets-Sheet 1
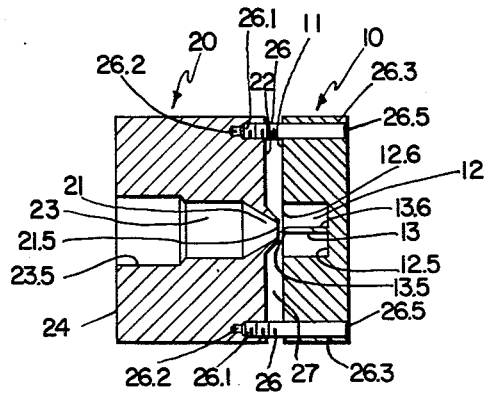
FIG. 1
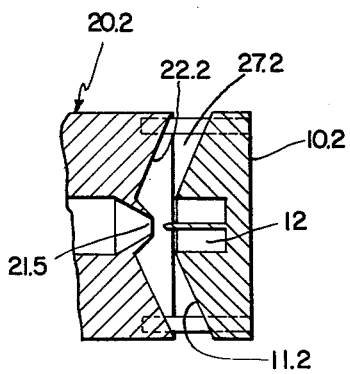
FIG. 3
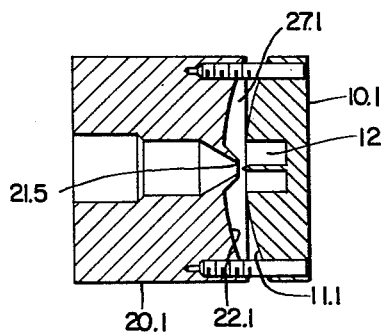
FIG. 2
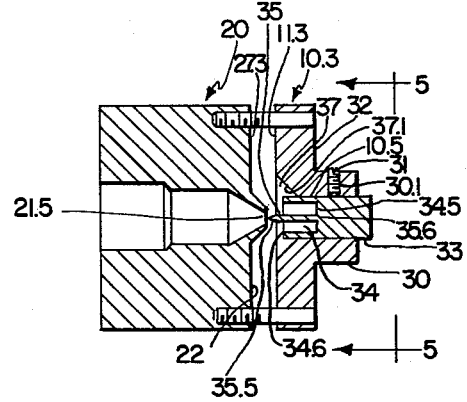
FIG. 4
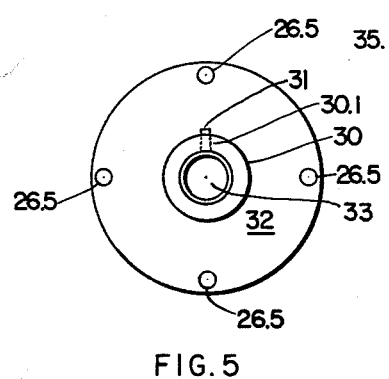
FIG. 5
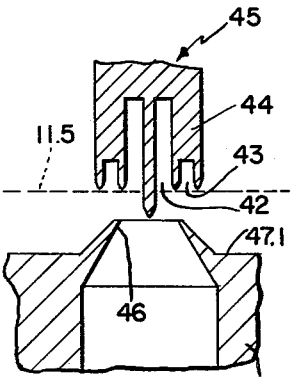
FIG. 4A
FIG. 6
INVENTOR.
STANLEY R. RICH
BY
ATTORNEY Feb. 16, 1965     S. R. RICH     3,169,509
ELASTIC WAVE GENERATOR Original Filed Jan. 18, 1962     2 Sheets-Sheet 2

INVENTOR.
STANLEY R RICH
BY
ATTORNEY 3,169,509
ELASTIC WAVE GENERATOR
Stanley R. Rich, West Hartford, Conn., assignor, by mesne assignments, to Northern Industries, Inc., Dover, Del., a corporation of Delaware
Filed Apr. 8, 1963, Ser. No. 271,441
13 Claims. (Cl. 116—137)

This application is a continuation-in-part of my previously filed application Serial No. 167,107 filed January 18, 1962, now abandoned.

This invention relates in general to apparatus for generating high intensity elastic waves in a gaseous medium, and more particularly to the class of such apparatus which depends for its operation upon fluid dynamics in a structure having parts fixed relative to one another, rather than upon relative motion between parts of a structure having relatively movable parts.

It is the principal object of the present invention to provide new and improved apparatus for generating elastic waves in a gaseous medium, more particularly, to increase the efficiency of such apparatus, and to improve the impedance match between such elastic wave generators and the ambient medium into which their gas supply is exhausted. It is an additional object of the invention to provide such apparatus which depends for its operation upon fluid dynamics in a structure having parts fixed relative to one another. An additional object is to provide such apparatus which is able to generate and radiate "sound" intensities as high as 160 db (1 watt/cm.$^2$) and higher in a gaseous medium (e.g., air), and total power of the order of tens or hundreds of watts, both economically and dependably. Still another object of the invention is to provide such apparatus which can be made to operate in the ultrasonic frequency range, or in two or more frequency ranges simultaneously.

Additional objects of the invention are to provide such apparatus which does not have severe dimensional tolerances, which will be economical to build and operate, and rugged in construction, which will require little or no maintenance, which will resist contamination during operations with foams, for example, which will be easily cleaned, assembled and put into use, and which can be adapted to all types and kinds of gas-phase applications of elastic wave power.

According to the invention, there is provided an apparatus for generating elastic waves in a gaseous medium comprising a gas-driven source of elastic wave energy having an input for driving gas and an output for exhaust gas and for said elastic wave energy, and means providing a radial venturi passage of progressively increasing transverse sections coupled at the end of smaller transverse section to said output for exhausting said gas to an ambient region at a velocity substantially less than the gas velocity at said output.

According to the invention in one of its more particular aspects, there is provided a new and improved apparatus for generating high intensity elastic waves in a gaseous medium comprising, a first member having a first surface and a cavity with an opening thereinto through said first surface, and a second member having a gas nozzle confronting said opening for propelling a stream of gas toward said cavity for generating elastic waves, said second member having a second surface surrounding said nozzle and confronting said first surface, said first and second surfaces defining an annular venturi passage in which the pressure of gas flowing radially in said passage increases substantially exclusively dially in said passage increases substantially exclusively as a function of the radius of said passage, said passage being simultaneously adapted to guide said elastic waves.

In another embodiment of the invention, there is provided an improved apparatus for generating elastic waves in a gaseous medium comprising, a first member having a first surface and a cavity with an opening thereinto through said first surface, a pin having a free end, said pin being located at least in part in said cavity and extending in the direction of a line which extends from a wall of said cavity through said opening, said free end being directed away from said wall, and a second member having a gas nozzle confronting said opening for propelling a stream of gas substantially toward the interior of said cavity, said second member having a second surface surrounding said nozzle and confronting said first surface, said first and second surfaces defining an annular venturi passage in which the pressure of gas flowing radially in said passage is a function substantially only of the radius of said passage, said passage being simultaneously adapted to guide said elastic waves.

According to the invention in another of its aspects, there is provided an apparatus for generating elastic waves at a plurality of frequencies in a gaseous medium comprising, a first member having a first cavity with an opening thereinto, a second cavity surrounding said first cavity also having an opening thereinto, said openings facing in the same direction, and a second member having a gas nozzle confronting said opening of said first cavity for propelling a stream of gas toward said cavities for generating elastic waves.

By the term "high intensity" is meant elastic wave energy in a gaseous medium (e.g., "sonic" or "ultrasonic" energy) at an intensity level up to about 160 db (1 watt/cm.$^2$). By the term "gas" it is meant to include steam, air, nitrogen, carbon dioxide and the like.

Figure 9:
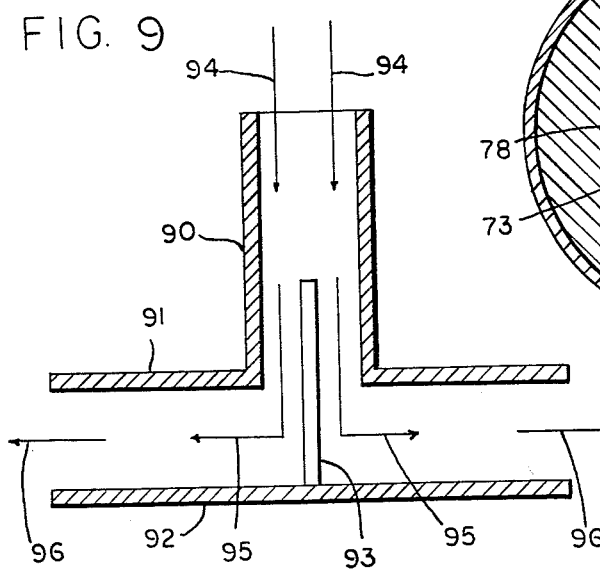
Figure 8:
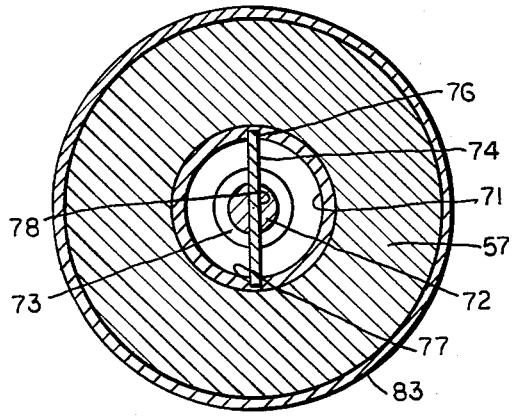

Other and further objects and features of the invention will become apparent from the following description of certain embodiments thereof. This description refers to the accompanying drawings, wherein:

FIG. 1 is an axial section of a first embodiment;
FIG. 2 is an axial section of a second embodiment;
FIG. 3 is a partial axial section of a third embodiment;
FIG. 4 is an axial section of a fourth embodiment;
FIG. 4A is a modification of FIG. 4, shown in axial section;
FIG. 5 is an end view of the embodiment of FIG. 4 taken along line 5—5 in FIG. 4;
FIG. 6 is a partial axial section of another embodiment;
FIG. 7 is an axial section showing another embodiment of the invention as a complete unitary device;
FIG. 8 is a cross-section taken on line 8—8 in FIG. 7; and
FIG. 9 is a diagram useful to explain the invention.

Referring to FIG. 1, a first member 10 of cylindrical form has a flat surface 11 at one end thereof and a cylindrical cavity 12 axially disposed therein and opening at one end 12.6 through said flat surface 11. A pin 13 having a pointed end 13.5 is axially mounted in the cavity 12 with one end 13.6 affixed to the bottom wall 12.5 of the cavity and the pointed end 13.5 extending through the opening 12.6 of the cavity. A second cylindrical member 20 has a gas nozzle 21 axially disposed therein and projecting through a flat surface 22. The nozzle 21 projects forward of the surface 22 and has an orifice 21.5 which is smaller in diameter than the cavity 12, and communicates with a bore 23 of larger diameter passing through the second member 20 to the rear boundary 24 thereof. The bore 23 may be suitably fitted (as with internal threads, not shown)

at the end 23.5 meeting the rear boundary 24, for attachment of a feed pipe (not shown) for gas.

The first and second members 10 and 20, respectively, are supported with respect to each other by standoff posts 26 which are each mounted respectively at one end 26.1 in a bore 26.2 in the second member 20 opening through the surface 22 near the outer periphery thereof. The first member has corresponding bores 26.3 passing through it and is assembled to the second member by fitting it over the posts 26 and welding the outer ends 26.5 of the posts to the first member 10. An annular space 27 is provided between the confronting surfaces 11 and 22, for a purpose and function to be described below.

The operation of the generator comprised of the cavity 12, pin 13 and nozzle 21 is believed to be as follows. When a gas, such as air, is propelled at the opening 12.6 of the cavity 12, and at the pointed end 13.5 of the pin 13, through the orifice 21.5 of the nozzle 21, in the form of an air jet, the jet strikes the point 13.5, which acts like a "whistle edge" reduced to the smallest possible dimension, namely a single point. The air in the jet strikes this point, the enters the cavity and exits from the cavity, generating intense "sound waves" as it does so. These waves have a frequency of oscillation related to the depth and diameter of the cavity 12. Typical dimensions for frequencies in the range 8,000 to 24,000 cycles per second are:

(a) diameter of orifice 21.5—⅛ inch;
(b) projection of nozzle 21 from surface 22—⅛ inch (approximately);
(c) diameter of cavity 12—¼ inch;
(d) depth of cavity 12:
  (i) for frequencies of the order of 20 kc./sec.—⅛ inch
  (ii) for frequencies of the order of 12 kc./sec.—5/16 inch;
(e) projection of pin outside of open end 12.6 of cavity 12—3/16 inch (approximately);
(f) distance between opening 12.6 of cavity 12 and nearest confronting end of nozzle 21—preferably 3/16 inch, and may approach ¾ inch.

The air pressure requirements of this generator are lower than for any previously designed dynamic generator. The present generator begins to operate at one (1) pound per square inch of excess pressure and produces industrially useful defoaming of certain (low viscosity) liquids at 5 pounds per square inch excess pressure. Its output sound power is linearly related to input pneumatic power from 1 p.s.i. to 70 p.s.i. (excess, or gauge, pressure). The speed of the air jet is approximately 1/10 the speed of sound in air, in the lowest pressure mode of operation, and varies to about 4 times the speed of sound at very high pressures. This device can be operated at jet speeds above and below the speed of sound in air.

Fluid dynamic generators of this general type, including the foregoing generator, as heretofore available exhaust gas from the jet directly into the ambient environment, which is typically the atmosphere, so that the excess, or gauge, pressure referred to above is pressure in excess of atmospheric pressure. The annular space 27 of the present invention constitutes a radial venturi passage in which the pressure of gas issuing radially away from the region of the open end 12.6 of the cavity 12 is less than the ambient (e.g., atmospheric) pressure at the outer periphery of the annular space 27, as will now be explained.

It is well known from Bernoulli's principle in gases that the total energy in a gas is proportional to the square of its velocity, directly proportional to the static pressure and directly proportional to the heat energy or temperature of the gas. It is also known from this principle that if a gas flowing through a pipe or conduit encounters a constricted portion of the pipe or conduit the velocity of gas flow will increase through the constriction and simultaneously the static pressure of the gas in the constriction will be reduced relative to the gas pressure outside the constriction, and that this relationship is reversible. Thus, if one considers a length of a conduit for a gas, which increases in cross-sectional area from one end to the other, the following relationship will exist with respect to a gas flowing through the conduit:

$$V_1^2 + P_1 \cong V_2^2 + P_2 - h$$

where:

$V_1$=the gas velocity at the end of smaller cross-section;
$V_2$=the gas velocity at the end of larger cross-section;
$P_1$=the static pressure at the end of smaller cross-section;
$P_2$=the static pressure at the end of larger cross-section;
and $h$=heat lost in the expansion of gas in the conduit.

Considering now the passage 27 in FIG. 1, it is seen that this is an annular passage bounded by the two flat surfaces 11 and 22, in which gas issuing away from the open end 12.6 of the cavity 12 moves radially from the center of the passage to the outer periphery thereof. As shown in this embodiment, these two surfaces are parallel to each other. The center is the "end" of this passage which is of smaller cross-sectional area, and the outer periphery is the "end" of larger cross-sectional area. Thus, if $V_1$ and $P_1$ are the velocity and pressure, respectively, of the gas at the smaller end of the passage 27, $V_2$ and $P_2$ are the velocity and pressure, respectively, of the same gas at the outer periphery of the passage. If the outer periphery meets the atmosphere, $P_2$ is the same as $P_a$, the atmospheric pressure, and $V_2$ may be re-designated $V_a$, the gas velocity at the atmosphere. The relation set forth above then becomes:

$$V_a^2 + P_a \cong V_1^2 + P_1 + h$$

Since $V_1 > V_a$, it follows that $P_a > P_1$, provided that $h$ is not too great; this condition is readily achieved in practice.

It may aid in understanding these dynamic conditions to consider FIG. 9, which is a well-known illustration of an application of Bernoulli's Law to the flow of a fluid through a short conduit or pipe the diameter or other cross-sectional dimensions of which varies gradually from one end to the other. If there is a steady flow through the pipe, the velocity varies inversely as the cross-sectional area, and the pressure varies as a direct function of the cross-sectional area. If a gas is blown in the direction of the arrows 94 through a tube 90 having a first disc 91 at its lower end confronting a second disc 92, with a pin 93 at its center to engage the tube 90, the gas will pass out between the discs in the direction of the arrows 95, 95 and 96, 96. The outer periphery of the discs 91 and 92 at the arrows 96, 96 is at atmospheric pressure, but, due to the fact that gas is escaping here at some positive velocity, the atmospheric pressure holds the two discs together against the gas being blown down the tube 94 in the direction of the arrows 94. The velocity of the escaping gas becomes greater toward the arrows 95 nearer the center of the discs, because the cross-section of the radial passage becomes smaller toward the center. Accordingly, this passage may be termed a "radial venturi," since it resembles, dynamically, a pipe which is gradually constricted toward one end (the center in FIG. 9).

Thus, some of the kinetic energy of the gas issuing from the nozzle orifice 21.5, which heretofore has been wasted, is used to reduce the static pressure at the orifice below the static ambient pressure at the periphery of the passage 27. This contributes a number of advantages to the improved generator of the present invention, among which are the following:

(a) Since the gas pressure at the nozzle is below the gas pressure of the ambient medium, an elastic wave generator improved by the present invention will provide the same intensity of elastic wave energy as prior generators when supplied with gas at an excess or gauge pressure which is less than the pressure previously required, or, alternatively, it will supply elastic wave energy at a higher intensity when supplied with the same excess or gauge pressure as my prior generator; the net result is an increase in efficiency of the generator.

(b) The elastic wave energy is better impedance-matched to the surrounding ambient medium, since the radial venturi passage serves simultaneously as an "acoustic horn" which smoothly couples the elastic wave energy from its source (cavity 12) to the ambient (e.g., atmosphere) load, and eliminates completely any possibility of a gas pressure discontinuity between the ambient medium and the escaping gas which is the propagating medium for the elastic wave energy.

(c) The improved generator of the present invention resists contamination and clogging by materials with which it is used; I have found that with a generator according to FIG. 1, for example, there is no foam or mist which will penetrate into the venturi space 27 during operation, and hence no clogging of the cavity 12 by the material being treated.

I have built and tested generators according to the present invention, and have observed all of the foregoing advantages.

The spacing between the confronting surfaces 11 and 22 in FIG. 1 may be of the order of 3/16" for both the 12 kc./sec. and the 20 kc./sec. versions of this embodiment mentioned above. It will be appreciated that other spacings may be used to achieve the same function and advantages; the choice of a particular spacing will depend, among other things, upon the contours of the surfaces, specific nozzle and cavity dimensions, and the radius of the venturi passage. If the radius at the periphery, or exhaust end of the venturi passage, is twice the radius of the venturi passage immediately following the resonator 12, this will reduce the velocity of gas flow after the gas leaves the resonator by a factor of two to one. This slows down the gas to half the original exhaust velocity, and recaptures 3/4 of the kinetic energy (which, as noted above, is proportional to the square of the gas velocity). Preferably, I use a radius ratio of 3:1, theoretically recapturing 8/9 of the kinetic energy of the escaping gas.

It is the intent in the present invention that the term "radial venturi passage" shall apply to the space between two confronting surfaces which are parallel to each other or so nearly so, that the cross-sectional area of the passage between them, radiating outward from confronting points (e.g., the centers) in the two surfaces, varies substantially in direct proportion to the distance from these two points. In the simplest case, as illustrated in the embodiments herein described, the confronting surfaces defining the radial venturi passage are circular and parallel to each other, and the cross-sectional area of each passage varies, from the center, in direct proportion to the radius.

FIG. 2 shows a generator which is identical to that of FIG. 1 in all respects, except that the radial venturi passage 27.1 of FIG. 2 is curved, rather than flat as in FIG. 1. The first member 10.1 in FIG. 2 has a convex surface 11.1 through which the cavity 12 opens, and the second member 20.1 has a concave surface 22.1 through which the orifice 21.5 projects. Other parts of FIG. 2 are substantially identical with corresponding parts of FIG. 1, and duplicate reference characters have been omitted to avoid needlessly burdening the drawings with them. The curved passage 27.1 serves to project elastic wave energy forward, that is, toward the right-hand side of the drawing as seen in FIG. 2.

FIG. 3 has a conical radial venturi passage 27.2 which serves the same purpose as the curved venturi passage 27.1 of FIG. 2. In FIG. 3, the first member 10.2 has a convex conical surface 11.2 through the apex of which the cavity 12 opens, and the second member 20.2 has a concave conical surface 22.2 through the apex of which the nozzle orifice 21.5 opens. Again, as in FIG. 2, the remaining structure of FIG. 3 is like the corresponding structure of FIG. 1.

FIGS. 4 and 5 show an embodiment of the invention in which the second member 20 is identical in all respects with the second member 20 of FIG. 1. The first member 10.3 has an axial bore 10.5 through it opening through its surface 11.3 confronting the surface 22 of the second member 20 surrounding the orifice 21.5. An extension 30 on the outer surface 32 of the first member 10.3 continues the bore 10.5, and is provided with a lateral passage 30.1 and a set-screw 31. A cylindrical part 33 having an axial cavity 34 opening through one end 34.6 has a pin 35 with a pointed end 35.5 axially disposed in it and mounted at the other end 35.6 on the bottom wall 34.5 of the cavity. The cavity 34 and pin 35 have the same purpose and function as the cavity 12 and pin 13 of FIGS. 1, 2 and 3. The cylindrical part can be axially adjusted and locked in position by means of the set screw 31. The surface 11.3 of the first member 10.3 confronting the second member 20 defines with the surface 22 of the second member surrounding the orifice 21.5 a venturi passage 27.3 which has the same function as the venturi passage 27 in FIG. 1.

An annular depression 37 in the surface 11.3 of the first member 10.3 surrounds the bore 10.5 and confronts the nozzle 21.5 of the second member 20. This depression has a bottom surface 37.1 which slopes gradually toward the bore 10.5. It enables the confronting surfaces 22 and 11.3 defining the venturi passage 27.3 to be brought close together while at the same time permitting a wide latitude of spatial adjustment between the orifice 21.5 and the cavity 34 and pin 35, through axial adjustment of the cylindrical part 33 in the bore 10.5 of the first member 10.3. If this feature is not desired, the annular depression 37 can be omitted, as in the first member 10.4 shown in FIG. 4A. FIG. 5 shows the structural arrangement of the outer ends 26.5 of four standoff posts; this is a useful arrangement, although a lesser or a greater number of posts may be used, if desired.

I have discovered that the annular depression 37, bounded on the deeper side by the portion of the outer wall of the cylindrical part 33 which surrounds the mouth of the cavity 34, functions as a secondary cavity which resonates at approximately the third harmonic of the primary cavity 34. This is believed to be due to the fact that gas discharging through the nozzle 21.5 striking the pointed end 35.5 of the pin is in part deflected across the peripheral edge of the opening 34.6 of the primary cavity 34, where it causes the surrounding depression 37 to generate elastic waves at the same time that the primary cavity 34 is generating elastic waves. I have measured the frequency of the waves generated by both cavities and found that the third harmonic of the primary cavity resonance is excited with particular ease in the secondary cavity 37.

FIG. 6 illustrates a generator having a primary resonator cavity 42 and an annular secondary resonator cavity 43 axially and concentrically disposed in one end 44 of a cylindrical part 45, confronting a nozzle orifice 46. The orifice is in a second member 47, shown in part only, having a wave guiding surface 47.1 surrounding the orifice and facing toward the cavities. The orifice opening is preferably smaller in diameter than the primary cavity. The cylindrical part 45 bearing the cavities may be held in a first member (not shown) resembling the first member 10.4 of FIG. 4A, in place of the cylindrical part 33, in which case the wave guiding surface 11.3 will have a position in FIG. 6 represented by the dotted line 11.5. The primary and secondary cavities 42, 43, respectively, may have depths such that the primary cavity is approximately three times deeper than the secondary cavity, and the secondary cavity will then readily generate the third harmonic frequency of the frequency generated in the primary cavity.

Each of the embodiments of the invention shown in the accompanying drawings is a cylindrical figure of revolution about a central axis (not shown), as can be appreciated from FIG. 5. Other forms are possible; the cylindrical form is preferred for its obvious simplicity in fabrication. All the parts may be made of any suitable material. Stainless steel of the 300 series is preferred but, when it cannot be used in a particular application, another material may be used.

FIGS. 7 and 8 illustrate another embodiment of the present invention as a complete unitary device. A first cylindrical body 50, having a convex conical surface 51 and a first axial bore 52 passing through it, confronts a second cylindrical body 55 having a concave conical surface 56 and a second axial bore 57 passing through it. These two bodies are mounted one to the other by stand-off posts 58, 59, which may be welded or otherwise fastened in place, so that the convex and concave surfaces 51 and 56, respectively, are spaced apart and parallel to each other, to form a radial venturi passage according to the present invention, and the bores 52 and 57 are collinear on the common axis A—A. The apparatus is a figure of revolution about the axis A—A, as is apparent from FIG. 8.

A cylindrical elongated resonator part 60 is located in the bore 52 in the first body 50. The resonator part has at one end a resonator cavity 61, of which one end 62 confronting the second body 55 is open; the other end 63 is closed. The resonator part 60 is held in the bore 52 by a set screw 65. A somewhat hemispherical cover 66 is fitted over the right-hand ends of the body 50 and the resonator part 60, for streamlining purposes. This cover is held in place by a second set screw 68.

The bore 57 in the second body 55 is fitted with a gas nozzle 70 confronting the open end 62 of the resonator cavity 61. This nozzle comprises a hollow cylindrical part 71 which fits tightly into the bore 57, and has its inner cross-section tapered to a smaller diameter as it approaches the resonator cavity 61, and a solid cylindrical part 72 axially disposed within the hollow part to provide an annular gas passage 73 confronting the resonator cavity. The outer diameter of the gas passage is approximately the same as, or slightly smaller than, the diameter of the open end 62 of the resonator cavity. The nozzle parts 71 and 72 are held together by a spanner bar 74 which is fitted into two diametrically-opposite slots 76, 77 in the end of the hollow member 71 remote from the resonator cavity 61, and in a slot 78 at the corresponding end of the solid part 72. The region at the left-hand end of the bore 57 may be internally threaded, for attachment to a gas-feed pipe (not shown).

A wave director 82, having a cylindrical collar part 83 and an integral bell part 84 holds the second body 55 in the collar part. The base 85 of the collar part is apertured for passage of a gas-feed pipe. The bell part 84 has its inner surface at the juncture with the collar part 83 substantially in register with the concave surface 56 of the second body 55, from which the bell part flares outward from the axis A—A and projects forward to envelope the first body 50 and its contents.

Exhaust gas and generated elastic wave energy pass through the radial venturi passage to the bell part of the wave director, which directs both forward over the first body 50 and cover 66. According to the invention, during operation, the gas pressure at the nozzle passage 73 is below atmospheric pressure, and the gas pressure at the outer periphery of the radial venturi passage is atmospheric pressure or very nearly so. From there, the passage between the wave director bell part 84 and the confronting surfaces of the first body 50 and the cover 66 flares open in the direction transverse to the direction of propagation of exhaust gas and elastic wave energy.

The embodiments of the invention which have been illustrated and described herein are but a few illustrations of the invention. Other embodiments and modifications will occur to those skilled in the art. For example, the nozzle structure of FIG. 7 may be used with the cavity structure of FIG. 1, and vice versa. The radial venturi structure may be applied to other forms of gas-driven generators of elastic wave energy, not herein illustrated. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is.

1. Apparatus for generating elastic waves in a gaseous medium comprising: a first member having a first surface and a cavity with an opening thereinto through said first surface, and a second member having a gas nozzle confronting said opening for propelling a stream of gas toward said cavity for generating elastic waves, said second member having a second surface surrounding said nozzle and confronting said first surface, said first and second surfaces defining an unobstructed annular venturi passage for gas flow in which the pressure of gas flowing radially in said passage increases substantially only as a function of the radius of said passage, said passage being simultaneously adapted to guide said elastice waves, the ratio of the larger radius of said passage to the smaller radius thereof being substantially greater than unity.

2. Apparatus for generating elastic waves in a gaseous medium comprising: a first member having a first convex surface and a cavity with an opening thereinto through said first surface, and a second member having a gas nozzle confronting said opening for propelling a stream of gas toward said cavity for generating elastic waves, said second member having a second concave surface surrounding said nozzle and confronting said first surface, said first and second surfaces defining an unobstructed annular venturi passage for gas flow in which the pressure of gas flowing radially in said passage increases substantially only as a function of the radius of said passage, said passage being simultaneously adapted to guide said elastic waves, the ratio of the larger radius of said passage to the smaller radius thereof being substantially greater than untiy.

3. Apparatus for generating elastic waves in a gaseous medium comprising: a first member having a first surface and a bore through said first member directed normal to said first surface, a part in said bore having at one end a cavity with an opening thereinto through said first surface, a second member having a gas nozzle confronting said opening for propelling a stream of gas toward said cavity for generating elastic waves, said second member having a second surface surrounding said nozzle and confronting said first surface, said first and second surfaces defining an unobstructed annular venturi passage for gas flow in which the pressure of gas flowing radially in said passage increases substantially only as a function of the radius of said passage, said passage being simultaneously adapted to guide said elastic waves, the ratio of the larger radius of said passage to the smaller radius thereof being substantially greater than unity, and means on said first member to adjust said part and with it said opening and said cavity toward and away from said nozzle.

4. Apparatus for generating elastic waves in a gaseous medium comprising, a first member having a first surface and a cavity with an opening thereinto said first surface, and a second member having a gas nozzle confronting said opening for propelling a stream of gas substantially toward the interior of said cavity, said second member having a second surface surrounding said nozzle and confronting said first surface, said first and second surfaces defining an unobstructed annular venturi passage for gas flow surrounding said nozzle and said opening for gas issuing from said nozzle, the dimensions of said passage being such that the velocity of gas flowing radially in said passage will decrease substantially only as a function of the radius of said passage, whereby the pressure of said gas flowing radially in said passage is a function substantially only of the radius, said passage being simultaneously adapted to guide such elastic waves toward said outer periphery, the ratio of the larger radius of said passage to the smaller radius thereof being substantially greater than unity.

5. Apparatus for generating elastic waves in a gaseous medium comprising, a first member having a first convex surface and a cavity with an opening thereinto through said first surface, and a second member having a gas nozzle confronting said opening for propelling a stream of gas substantially toward the interior of said cavity, said second member having a second concave surfaces surrounding said nozzle and confronting said first surface, said first and second surfaces defining an unobstructed annular venturi passage for gas flow surrounding said nozzle and said opening for gas issuing from said nozzle, the dimensions of said passage being such that the velocity of gas flowing radially in said passage will decrease substantially only as a function of the radius of said passage, whereby the pressure of said gas flowing radially in said passage is a function substantially only of the radius of said passage, said passage being simultaneously adapted to guide such elastic waves toward said outer periphery, the ratio of the larger radius of said passage to the smaller radius thereof being substantially greater than unity.

6. Apparatus for generating elastic waves in a gaseous medium comprising, a first substantially cylindrical member having a first round surface at one end thereof and a cylindrical cavity axially disposed in said first member with an opening thereinto through said first surface, and a second substantially cylindrical member having a gas nozzle axially disposed therein and confronting said opening for propelling a stream of gas substantially toward the interior of said cavity, said second member having a second round surface at one end thereof surrounding said nozzle and confronting said first surface, said first and second surfaces defining an unobstructed annular venturi passage for gas flow surrounding said nozzle and said opening for gas issuing from said nozzle, the dimensions of said passage being such that the velocity of gas flowing radially in said passage will decrease substantially only as a function of the radius of said passage, whereby the pressure of said gas flowing radially in said passage is a function substantially only of the radius of said passage, said passage being simultaneously adapted to guide such elastic waves toward said outer periphery, the ratio of the larger radius of said passage to the smaller radius thereof being substantially greater than unity.

7. Apparatus for generating elastic waves in a gaseous medium comprising, a first member having a first surface and a bore through said first member directed normal to said first surface, a part in said bore having at one end a cavity with an opening thereinto through said first surface, and a second member having a gas nozzle confronting said opening for propelling a stream of gas substantially toward the interior of said cavity, said second member having a second surface surrounding said nozzle and confronting said first surface, said first and second surfaces defining an unobstructed annular venturi passage for gas flow surrounding said nozzle and said opening for gas issuing from said nozzle, the dimensions of said passage being such that the velocity of gas flowing radially in said passage will decrease substantially only as a function of the radius of said passage, whereby the pressure of said gas flowing radially in said passage is a function substantially only of the radius of said passage, said passage being simultaneously adapted to guide such elastic waves toward said outer periphery, the ratio of the larger radius of said passage to the smaller radius thereof being substantially greater than unity, and means on said first member to adjust said part and with it said opening and said cavity toward and away from said nozzle.

8. Apparatus for generating elastic waves in a gaseous medium comprising: a hollow acoustic resonator having an opening thereinto, means to propel a stream of gas at said opening for generating said waves, and means providing a radial venturi passage for gas flow of progressively increasing transverse sections coupled at the end of smaller transverse section to said opening for exhausting the gas of said stream to an ambient region at a velocity substantially less than the gas velocity at said opening, the ratio of the largest transverse section of said passage to the smallest transverse section thereof being substantially greater than unity.

9. Apparatus for generating elastic waves in a gaseous medium comprising: a hollow acoustic resonator having an opening thereinto, gas nozzle means to propel a stream of gas at said opening for generating said waves, and means providing a radial venturi passage for gas flow of progressively increasing transverse section coupled at the end of smaller transverse section to said opening for exhausting the gas of said stream to an ambient region at a velocity substantially less than the gas velocity at said opening, the ratio of the largest transverse section of said passage to the smallest transverse section thereof being substantially greater than unity, said nozzle means comprising first and second concentric elements having an annular passage between them.

10. Apparatus for generating elastic waves in a gaseous medium comprising: a hollow acoustic resonator having an opening thereinto, gas nozzle means to propel a stream of gas at said opening for generating said waves, and means providing on unobstructed radial venturi passage for gas flow of progressively increasing transverse section coupled at the end of smaller transverse section to said opening for exhausting the gas of said stream to an ambient region at a velocity substantially less than the gas velocity as said opening, the ratio of the largest transverse section of said passage to the smallest transverse section thereof being substantially greater than unity, said nozzle means comprising first and second concentric elements having an annular passage between them, and a spanner bar diametrically connecting said elements at the end remote from said resonator.

11. Apparatus for generating elastic waves in a gaseous medium comprising: a gas-driven source of elastic wave energy having an input for driving gas and an output for exhaust gas and for said elastic wave energy, and means providing an unobstructed radial venturi passage for gas flow of progressively increasing transverse section coupled at the end of smaller transverse section to said output for exhausting said gas to an ambient region at a velocity substantially less than the gas velocity at said output, the ratio of the largest transverse section of said passage to the smallest transverse section thereof being substantially greater than unity.

12. Apparatus for generating elastic waves in a gaseous medium comprising: a gas-driven source of elastic wave energy having an input for driving gas and a substantially cylindrical output opening for exhaust gas, and means providing a pair of spaced-apart substantially parallel annular surfaces of substantially like dimensions and substantially in register with each other defining the boundaries of an enclosed unobstructed annular venturi passage for gas flow of progressively increasing cross-section between a first substantially cylindrical opening into said passage and a second substantially cylindrical opening from said passage, said first opening and said output opening being of substantially the same size, said means and said source being so disposed relative to each other that said passage is coupled to said output opening via said first opening and said first opening is substantially in register with said output opening, the diameter of said second opening being at least approximately twice the diameter of said first opening.

13. Apparatus according to claim 12 in which the diameter of said second opening is substantially three times the diameter of said first opening.

References Cited by the Examiner

UNITED STATES PATENTS

| | | | |
|---|---|---|---|
| 852,647 | 5/07 | Blake | 340—12 |
| 1,530,899 | 3/25 | Limon | 116—137 |
| 1,812,234 | 6/31 | Braatelien | 116—137 |
| 1,890,212 | 12/32 | Bridgham | 116—137 |
| 1,980,171 | 11/34 | Amy | 116—137 |
| 2,238,668 | 4/41 | Wellenstein | 116—137 |
| 2,364,987 | 12/44 | Lee | 158—77 |
| 2,519,619 | 8/50 | Yellott et al. | 116—137 |
| 2,800,100 | 7/57 | Boucher | 116—137 |
| 2,944,029 | 7/60 | Jones et al. | 116—137 |
| 3,064,619 | 11/62 | Fortman | 116—137 |
| 3,070,313 | 12/62 | Fortman | 116—137 |

FOREIGN PATENTS

| | | |
|---|---|---|
| 70,342 | 11/58 | France. |
| 868,228 | 2/53 | Germany. |
| 140,350 | 8/61 | Russia. |
| 251,919 | 9/48 | Switzerland. |

LOUIS J. CAPOZI, *Primary Examiner.*

LEO SMILOW, *Examiner.*